United States Patent [19]
Hashimoto et al.

[11] 3,872,484
[45] Mar. 18, 1975

[54] METERING DEVICE FOR A SINGLE LENS REFLEX CAMERA

[75] Inventors: Teiji Hashimoto, Kawasaki; Takehiko Kiyohara, Zama; Takashi Uchiyama; Tokuichi Tsunekawa, both of Yokohama; Masamichi Kakunodate; Soichi Nakamoto, both of Tokyo, all of Japan

[73] Assignee: Canon Kabushiki Kaisha, Tokyo, Japan

[22] Filed: May 20, 1974

[21] Appl. No.: 471,188

[30] Foreign Application Priority Data
May 24, 1973 Japan.............................. 48-58370

[52] U.S. Cl....................... 354/59, 354/31, 354/55, 354/56, 354/152
[51] Int. Cl......................... G03b 7/08, G03b 19/12
[58] Field of Search............ 354/23, 26, 31, 42, 54, 354/55, 56, 59, 152, 155, 224

[56] References Cited
UNITED STATES PATENTS
3,280,714  10/1966  Gunther et al........................ 354/55
3,540,364  11/1970  Ono.................................... 354/55
3,559,551  2/1971  Ono.................................... 354/55
3,561,855  2/1971  Mayr et al. ....................... 354/31 X
3,612,703  10/1971  Irisawa et al...................... 354/56 X
3,636,839  1/1972  Yamamoto ........................... 354/31
3,638,548  2/1972  Kurihara.............................. 354/55
3,643,575  2/1972  Ono.................................... 354/42
3,726,197  4/1973  Hasegawa et al..................... 354/55
3,791,276  2/1974  Ueda et al. ............................ 354/23

*Primary Examiner*—Richard A. Wintercorn
*Attorney, Agent, or Firm*—Flynn & Frishauf

[57] ABSTRACT

In a single lens reflex camera, a metering device comprises a metering element provided on the back side of a movable mirror so that, in raised position of the mirror, light passed through the picture-taking lens of the camera to the surface of a shutter curtain or of a photographic film and reflected by such surface may be received by the metering element to determine the exposure without the incident light from the picture-taking lens being directly passed to the metering element.

3 Claims, 9 Drawing Figures

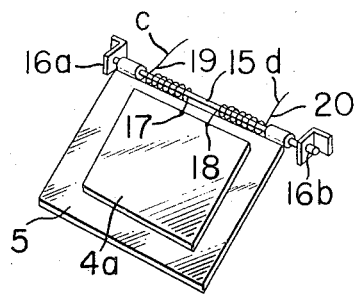
FIG. 3(a)
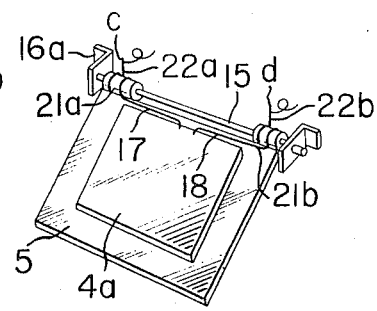
FIG. 3(b)
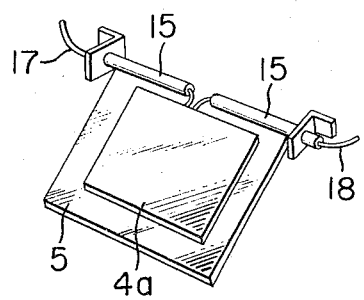
FIG. 3(c)
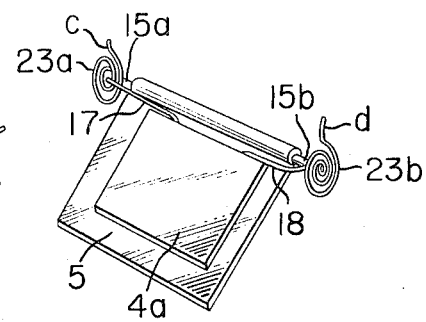
FIG. 3(d)
FIG. 4
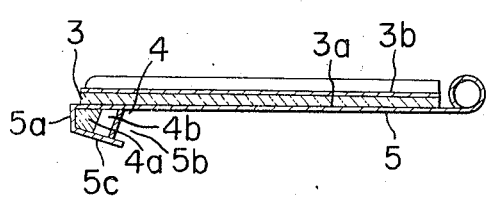
FIG. 5
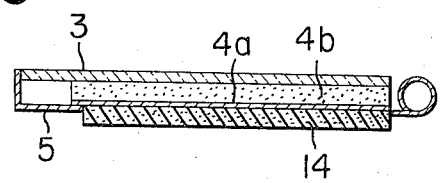
FIG. 6
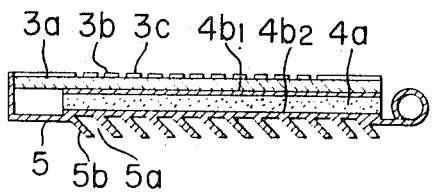

3,872,484

METERING DEVICE FOR A SINGLE LENS REFLEX CAMERA

BACKGROUND OF THE INVENTION

1. Field of the Invention

This invention relates to a metering device for TTL type single lens reflex cameras.

2. Description of the Prior Art

A metering system is generally known whereby light passed through a picture-taking lens to the surface of a photographic film or of a shutter curtain is reflected by such surface and the reflected light is received by a metering element to provide a proper exposure. In the past, however, the metering element has been disposed on the inner bottom wall surface of the camera housing in such an orientation that the element can receive the reflected light from the surface of the film or of the shutter curtain. This has limited the light-sensing area of the metering element and also, has offered such a problem that the incident light passed from the picture-taking lens is liable to be sensed by the metering element, thus making it difficult to provide desirable proportionality between the brightness of an object to be photographed and the output value of the metering element.

SUMMARY OF THE INVENTION

In view of the above-noted situations, the present invention intends to provide a metering device for a singel lens reflex camera which device comprises a metering element provided on the back side of the movable mirror within the camera, and an incidence light direction restricting structure provided on the surface of the metering element, whereby in raised position of the mirror the direct light from the picture-taking lens may be intercepted while the reflected light from the surface of the film or of the shutter curtain may be received by the metering element.

The invention will become more fully apparent from the following detailed description of some embodiments thereof taken in conjunction with the accompanying drawings.

BRIEF DESCRIPTION OF THE DRAWINGS

FIGS. 3($a$), ($b$), ($c$) and ($d$) show various forms of the means for permitting the lead wires to be led out from the metering element toward the camera housing.

FIG. 4 shows the construction of a second embodiment of the present invention.

FIG. 5 shows the construction of a third embodiment of the present invention.

FIG. 6 shows a fourth embodiment of the present invention.

DESCRIPTION OF THE PREFERRED EMBODIMENTS

Figure 1:
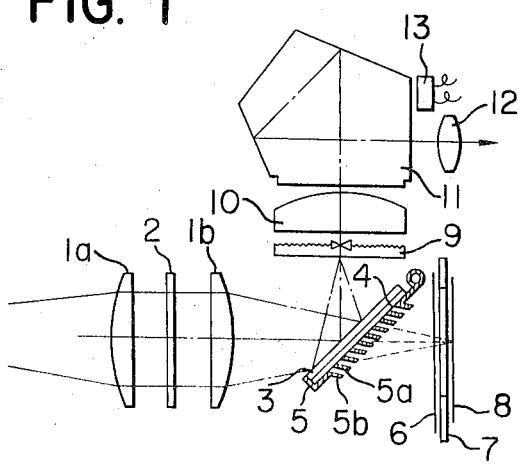
FIG. 1 is a schematic cross-sectional view of a first embodiment of the present invention with the movable mirror in its lowered position.
Figure 2:
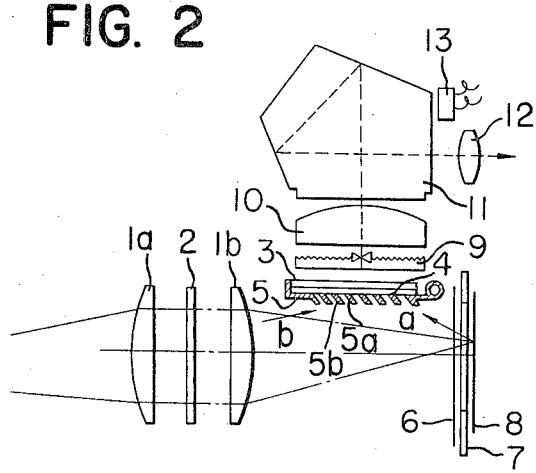
FIG. 2 is a mirror similar to FIG. 1 but with the mirror in its raised position.

Referring to FIGS. 1 and 2, there is shown a first embodiment of the present invention. Picture-taking lens components are designated by 1$a$ and 1$b$ and a diaphragm 2 is interposed therebetween. A movable mirror is designated by 3 and has a metering element 4 attached to the back side thereof. The movable mirror 3 and metering element 4 are supported by a frame member 5 which is pivotally mounted at one end. The frame member 5, as shown, is formed with a plurality of equally spaced, oblique window portions 5$a$ separated from one another by equally spaced, oblique wall portions 5$b$, thus providing an incident light direction restricting structure. Designated by 6 is a shutter curtain, behind which is an inner wall 7 of the camera housing and a film 8. The incident light direction restricting structure serves to restrict the incident light so that only the light reflected by the shutter 6 or the film surface may impinge on the metering element 4 when the movable mirror 3 has been moved up. There is further seen a focusing screen 9, a condenser lens 10, a pentaprism 11, an eyepiece 12 and a metering element 13.

Operation of the above-described construction will first be made of the lowered position of the mirror prior to picture-taking, as shown in FIG. 1. The light passed from an object to be photographed through the picture-taking lens 1$a$, 1$b$ and the diaphragm 2 is reflected by the surface of the mirror 3 to form an image on the focusing screen 9. The light diffused by the focusing screen 9 is passed through the condenser lens 10 and reflected by the pentaprism 11 so as to pass to the eyepiece 12. Part of the light reflected by the pentaprism 11 impinges on the metering element 13, which thus produces an output proportional to the brightness of the object and supplies such output to an exposure meter circuit, not shown, whereby a meter needle or like means indicates a proper exposure value such as aperture value or shutter time value before the picture-taking is initiated.

Thereafter, a shutter button or the like is depressed to move up the mirror 3, and this will be described with reference to FIG. 2. The light passed through the picture-taking lens 1$a$, 1$b$ and diaphragm 2 forms an image on the surface of the film 8, while part of the light is reflected by the surface of the shutter curtain 6 so as to pass through the window portions 5$a$ of the frame member 5 to the metering element 4. On the other hand, part of the light passed through the lens 1$a$, 1$b$ and diaphragm 2, such as the light beam indicated by $h$, is intercepted by the wall portions 5$b$ of the frame member 5. Since the output of the metering element 4 is a proportional to the brightness of the object during the picture-taking condition of the camera, this output of the metering element 4 operates a conventional exposure control system to provide a proper exposure.

FIGS. 3($a$), ($b$), ($c$) and ($d$) show various forms of means whereby the lead wires 17, 18 of the metering element 4 may be led out toward the camera housing. Designated by 4$a$ is a base plate for metering element. The frame member 5 is pivotally mounted on a pivot shaft 15 journalled in bearings 16$a$ and 16$b$.

In FIG. 3($a$), the lead wires 17 and 18 of the metering element 4 are connected to coil springs 19 and 20, respectively, wound around the pivot shaft 15. The frame member 5 is pivotable about the bearings 16$a$, 16$b$, and since the ends $c$, $d$ of the coil springs 19, 20 which are adjacent the camera housing are secured, the output signal of the metering element 4 may be taken out through such ends $c$, $d$ of the coil springs 19, 20 without being impeded by the pivotal mevement of the mirror 3.

In FIG. 3($b$), slippings 21$a$, 21$b$ are provided on the pivot portion of the frame member 5, and collectors 22$a$, 22$b$ are wound on the slippings 21$a$, 21$b$ and their ends adjacent the camera housing are secured. The lead wires 17, 18 of the metering element 4 are connected to the collectors 22a, 22b, whereby the output signal of the metering element 4 may be taken out through the ends c, d of the collectors 22a, 22b without being impeded by the pivotal movement of the mirror 3.

In FIG. 3(c), a pair of pivot shafts 15 is formed into a tubular form integral with the frame member 5 and lead wires 17, 18 are passed through these tubular shafts outwardly toward the camera housing, whereby the influence resulting from the twist of the lead wires imparted by the mirror 3 may be minimized.

In FIG. 3(d), hair springs 23a, 23b are secured at one end to the opposite ends 15a, 15b of the pivot shaft 15 and other ends of the hair springs 23a, 23b are secured to the camera housing. Lead wires 17, 18 are connected to these hair springs 23a, 23b, whereby the output signal of the metering element 4 may be taken out through the ends c, d of the hair springs 23a, 23b without being impeded by the pivotal moveof the mirror 3.

A second, a third and a fourth embodiment of the metering portion are shown in FIGS. 4, 5 and 6. In the second embodiment of FIG. 4, a mirror 3 comprises mirror glass 3a and mirror reflecting layer 3b. A metering element 4 comprises a base plate 4a is disposed within the hook portion 5a of a frame member 5 backing up the mirror 3 at the back side thereof. The metering element 4 responds to the light reflected by the surface of the film or of the shutter curtain and passed through the window portions 5b of the hook portion 5a of the frame member 5 to the light-sensing portion 4b of the metering element 4, while the direct light from the picturetaking lens is intercepted by the wall 5c of the hook portion 5a.

In the third embodiment of FIG. 5, the base plate 4a for metering element is attached to the back side of the movable mirror 3, and glass fiber filaments 14 focused on the surface of the light-sensing portion 4b are inclined at a suitable angle and formed into a planer form, which is integrally supported by a frame member 5, thus providing an incident light direction restricting structure.

In the fourth embodiment shown in FIG. 6, the mirror reflecting layer 3b is formed with slit-like transmitting portions 3c and the opposite sides of the base plate 4a for metering element are formed with light-sensing portions $4b_1$ and $4b_2$. The back side of the light-sensing portion $4b_2$ is formed with an incident light direction restricting structure which is similar to that of the first embodiment. Thus, in the lowered position of the mirror before picture-taking, the light passed through the lens 1a, 1b and diaphragm 2 is passed through the slit-like transmitting portions 3c to the light-sensing portion $4b_1$. In the raised position of the mirror during picture-taking, the light reflected from the surface of the film 8 or of the shutter curtain 6 is passed through the window portions 5a to the light-sensing portion $4b_2$. Instead of the mirror reflecting layer 3b being formed in the slit-like transmitting portions 3c, the mirror may be formed as a half-mirror.

In the above-described embodiments, the frame member is formed with an incident light direction restricting structure comprising a plurality of equally spaced, oblique window portions separated from one another by a plurality of equally spaced, correspondingly oblique wall portions, whereas the present invention is not limited to these embodiments but it should be understood that the spacings between the window portions and between the wall portions and their angle of inclination may be suitably selected to accomplish priority metering.

According to the present invention, as has fully been described, a metering element is provided on the back side of a movable mirror in a single lens reflex camera and an incident light direction restricting structure is provided on the surface of the metering element, so that the mirror in its raised position intercepts the direct incident light from the picture-taking lens so as to permit the metering element to receive only the reflected light from the surface of the film or of the shutter curtain, and this ensures an exact proportionality between the output of the metering element and the brightness of the object during the metering of the reflected light from the surface of the film or of the shutter curtain, thus enabling priority metering to be accomplished effectively. Also, the fact that the metering element can be disposed on the back side of the mirror leads to an increase in the light sensing area. These advantages are peculiar to the camera metering device of the present invention.

We claim:

1. A metering device for a single lens reflex camera having a movable mirror therewithin, said device comprising a metering element held on the back side of said movable mirror, and an incident light direction restricting structure formed on the light-sensing surface of said metering element, said restricting structure being inclined with respect to the light-sensing surface of said metering element so that it may intercept direct light from the picture-taking lenses of the camera in the raised position of said movable mirror so as to permit only the reflected light from the surface of a film or of a shutter curtain to be passed to said metering element.

2. A metering device according to claim 1, further comprising means for permitting the output terminals of said metering element to be led out through a pivot shaft for said movable mirror toward the body of the camera.

3. A metering device according to claim 1, wherein light-transmitting portions are formed in the surface of said movable mirror and a metering element is provided for sensing the light passed through said transmitting portions.

* * * * *